May 1, 1962 A. J. BEAUCHAMP 3,031,879
METHOD AND MEANS FOR TESTING THE FIBER BOND
IN THE SURFACE OF FIBROUS MATERIAL
Filed Oct. 13, 1959 2 Sheets-Sheet 2
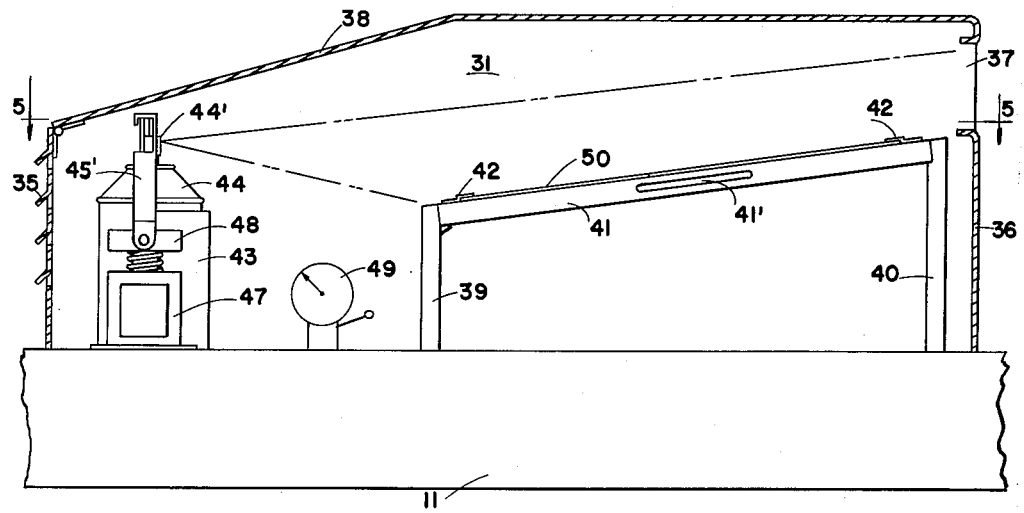
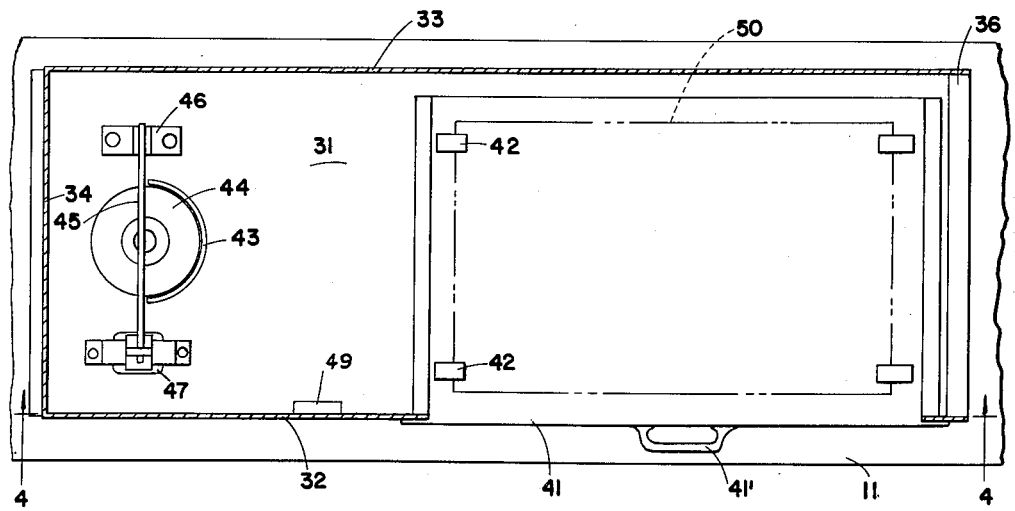
INVENTOR.
ALBERT J. BEAUCHAMP
BY
ATTORNEY 3,031,879
METHOD AND MEANS FOR TESTING THE FIBER BOND IN THE SURFACE OF FIBROUS MATERIAL
Albert J. Beauchamp, 108 N. 92nd Ave., Vancouver, Wash.
Filed Oct. 13, 1959, Ser. No. 846,081
3 Claims. (Cl. 73—7)

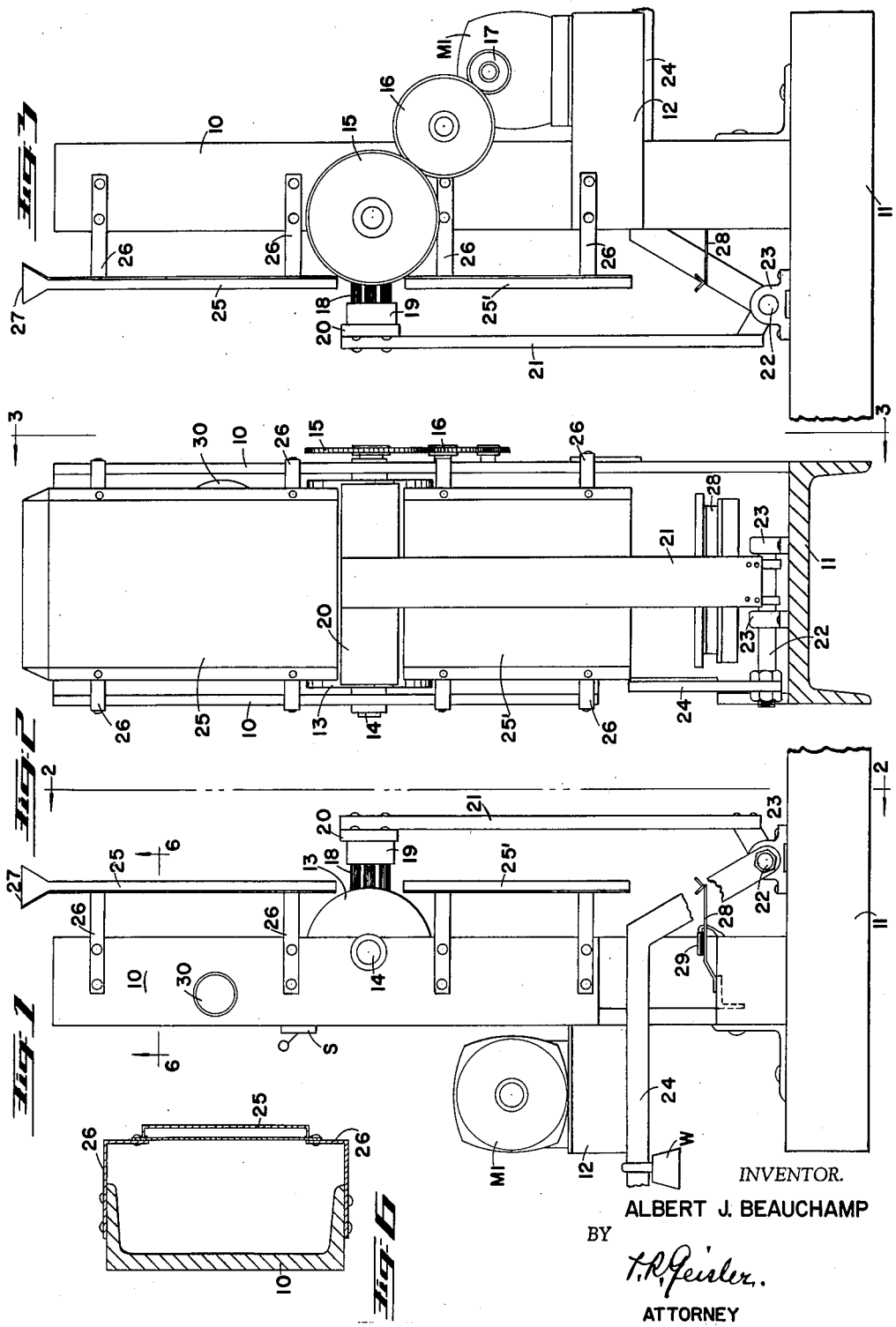

This invention relates in general to the testing of the bond set up between the fibers in fabricated fibrous material, particularly the fiber bond in papers, and, more specifically, relates to the testing of such bond in the surface of particular papers, such for example as card stock, wherein surface condition of the finished product is a matter of special importance. In other words, the present invention is concerned with the problem of loose fibers developing on the surface of paper sheets, particularly such as card stock and the like, and the detection of such condition.

Many factors are known to have an influence on the bonding of the fibers in paper. Loose fibers on the surface of the paper, to considerable extent however, are believed to be caused largely by the inability of one type of fiber to become homogeneous with the related or associated types of fiber. Thus some fibers do not hydrate as readily as others and during the formation of the fibrous sheet will have more of a tendency to float on the surface of the sheet and become only loosely attached to the formation, or have merely one end embedded in the formation. As the sheet progresses through the paper machine poorly bonded surface fibers are impressed into the sheet surface, due to pressure contact with felts, press rolls and calenders, so that the effect in the fiber bonding is not apparent and will not become manifest until subsequent converting operations exert a tendency to loosen the poorly bonded fibers in the sheet surface. Then the loosened fibers produce serious problems. They accumulate at various parts of the converting machine, fall into ink reservoirs, become deposits on printing rolls or plates, and, in general, cause an unsatisfactory end product.

The object of the present invention is to provide practical method and means for detecting unsatisfactory bond conditions during the manufacture of the sheet in order that corrective and preventive measures may be taken to remedy such condition in time to prevent loss of production or to prevent a defective product from reaching the ultimate consumer.

A further object of the invention is to provide a simplified method of testing the fiber bond in a sample of the sheet being manufactured which method will require no particular skill or experience on the part of the operator engaged in such testing.

Another object is to provide a method and suitable means by which such tests can be made quickly, thus within a few minutes, so that the desired control testing will be entirely practical during operation.

An additional object of the invention is to provide a satisfactory method of testing the fiber bond in the surface of a sheet being manufactured which would not entail any great cost outlay for the testing equipment required.

A still further object is to provide simple means for carrying out the method satisfactorily with different types of papers, thus with papers having surface characteristics of different softness, with not more than slight adjustment in such means being necessary.

The manner in which and the means by which these objects and other incidental advantages are attained will be briefly explained and described with reference to the accompanying drawings.

In brief the method of the invention consists in subjecting the surface of the paper sample being tested to a limited amount of abrasion sufficient to cause any unsatisfactorily bonded fibers of the surface to be raised and in making an observation of the abraded surface to determine whether fibers have been raised from the surface as a result. A preferred further optional step consists in passing a fine spray or mist from a thin quick-drying clear lacquer over the abraded surface and engaging the raised fibers without appreciably disturbing them, so as to cause some of the mist or spray to collect around any raised fibers on the abraded surface enabling them to be more easily felt or seen where the spray has dried and thus making more obvious the existence and approximate amount of such raised fibers appearing as a result of the test.

In the drawings:

FIG. 1 is an elevation of that portion of the preferred means employed in the carrying out of the invention by which the surface of a sample of paper is subjected to momentary abrasive treatment for the purpose of raising any poorly bonded fibers in the surface of the sample;

FIG. 2 is an elevation taken from the right of FIG. 1 and thus on the line 2—2 of FIG. 1;

FIG. 3 is an elevation taken on the line 3—3 of FIG. 2, and thus taken from the side opposite that shown in FIG. 1;

FIG. 4 is a sectional elevation on the line 4—4 of FIG. 5 of the other portion of the preferred means employed in the invention in which portion a thin spray of lacquer is delivered onto the sample of the paper after its abrasive treatment in the device of FIGS. 1, 2 and 3;

FIG. 5 is a section on line 5—5 of FIG. 4; and

FIG. 6 is a section on line 6—6 of FIG. 1.

Referring first to FIGS. 1, 2, 3 and 6, a suitable upright standard 10, preferably U-shaped in cross section, is secured on a base 11, the latter serving as the base for both portions of the preferred means for carrying out the invention. A reversible electric motor M1 is supported on a bracket 12 secured to the upright 10. A roll 13, having a soft rubber surfacing, is secured on a shaft 14 which is rotatably mounted in the upright 10. A gear 15, also secured on the shaft 14, meshes with a gear 16 which in turn meshes with the gear 17 driven by the motor M1. The motor speed and gear ratio are so arranged that operation of the motor in either direction will result in relatively slow rotation of the roll 13, for example with a preferred peripheral speed of about 15 inches per minute, although the actual speed is not critical.

A brush assembly 18 has a head 19 which is mounted on a cross member 20, the cross member 20 being supported at the top of a swingable arm 21. The bottom end of the arm 21 is secured to a horizontal shaft 22 which is rotatably mounted in suitable bearings 23 secured on the base 11. A lever arm assembly 24 is secured on the end of the shaft 22 and, as obvious from FIG. 1, is so arranged as normally to cause the brush assembly 18 to bear against the surface of the roll 13. In order to adjust the pressure of the brush assembly against the roll 13 (and thus to adjust the pressure of the bristles of the brush assembly against a sample of the paper or card stock moving between the roll and the brush assembly), adjustable weights W are mounted on the outer free end of the lever arm assembly 24.

A vertical chute 25 is mounted on the standard 10 by suitable bracket arms 26 located at the sides and is so positioned that its open bottom end will be located a slight distance from the roll 13 and directly above the portion of the roll surface where the top of the brush assembly normally contacts the surface of the roll. At the top of the chute 25 the broad side walls are sloped outwardly for a short distance so as to provide a convenient guideway 27 into the chute. A lower separated second portion 25' of the chute is mounted similarly on the standard 10 in exact vertical alignment with the upper portion and the open upper end of this lower portion 25' is spaced a short distance below the roll 13 and brush assembly, as shown in FIGS. 1 and 3. The bottom end of the lower portion 25' of the chute is open.

A flat spring member 28, mounted at one end in the standard 10, has its free end positioned below the open bottom end of the lower portion 25' of the chute, so as to be engaged by any card or paper sample dropping down into the lower portion of the chute. A microswitch, indicated diagrammatically at 29 in FIG. 1, is so arranged as to be actuated by any slight downward pressure on the member 28. Actuation of the microswitch 29, through the intermediary of a suitable relay (not shown) closes a circuit to a signal light 30 and also interrupts a circuit to the motor M1.

The testing means as thus far described and as illustrated in FIGS. 1, 2 and 3 is operated as follows:

The paper sample to be tested, for example, a piece of card stock, is used which has a width less than the interior width of the chute 25 and which has a length longer than the distance between the brush assembly 18 and the spring member 28 below the end of the bottom portion 25' of the chute, and thus longer than the upper portion 25 of the chute. Such sample to be tested is dropped into the top of the chute 25. The operator then turns the reversible switch S to the motor M1 in such direction as to cause the motor to drive the roll 13 (clockwise as viewed in FIG. 1) so as to move the sample downwardly. Slight finger pressure by the operator on the top of the sample in the chute 25 causes the bottom end of the sample to become engaged between the roll 13 and the bristles of the brush and to be gripped by the soft rubber surface of the roll. The rotating roll then draws the sample downwardly, dragging the sample past the brush, and moving the sample on down into the lower portion 25' of the chute until the bottom end of the sample is brought into engagement with the spring member 28. This results in interrupting the circuit to the motor M1 and also causes the signal light 30 to be lighted. The operator then reverses the switch S to the motor, causing the roll 13 to be rotated in the opposite direction so as to draw the sample upwardly until the sample is returned entirely to the upper portion of the chute, from which upper portion the sample can then be lifted entirely from the chute by the operator. When this is done the sample is ready for the second part of the test, which can be accomplished by the preferred further means presently to be described with reference to FIGS. 4 and 5.

Due to some over run of the motor M1, when the circuit to this motor is interrupted by the actuation of the microswitch 29, and to the corresponding momentary continued rotation of the roll 13, the sample which is being tested may be bent longitudinally slightly between the bottom of the lower portion 25' of the chute and the spring member 28. However if this occurs a slight lifting of the outer end of the lever arm assembly 24, causing the brush assembly to be moved away from the roll 13 momentarily, enables the sample to straighten out, whereupon release of the lever arm, pressing the upper end of the sample against the roll 13, results in the upper end of the sample again being frictionally gripped by the roll and driven upwardly back into the upper portion of the chute.

As apparent, the purpose of the means thus far described is to cause any unsatisfactorily bonded fibers in the surface of the sample, when engaged by the brush, to be partly raised from the surface. The pressure with which the brush bears against the sample surface to be tested, and thus the amount of abrasion most desirable for the testing of the particular grade of paper or card stock being handled, can be regulated by the adjustment of the weight or weights W on the lever arm assembly 24. This is important since it will be understood that softer grades of paper for example should not be subjected to as severe abrasion for the purpose of making such test as harder finished papers. Furthermore samples of light weight papers to be tested would, in some instances, have to be backed by some stiffening means, but this would not be any obstacle in the employing of the means described for producing the raising of the unsatisfactorily bonded fibers on the paper surface.

Referring now to FIGS. 4 and 5, a cabinet 31 is supported on the base 11 and has a pair of parallel side walls 32 and 33, an end wall 34 which is provided with ventilator openings 35, an opposite end wall 36 which extends only part way to the top of the cabinet so as to leave an open area 37 above the end wall, and a hinged top wall or cover 38. A pair of end supporting members 39 and 40, located inside the cabinet, provide the means for supporting a sample-carrying tray 41 on which the sample of paper or card stock which is being tested is placed. The sample is placed on the tray 41 with its abraded face uppermost. Suitable spring fingers, indicated diagrammatically at 42, are provided on the tray 41 for holding the sample flat on the tray. Preferably the tray 41 is slidable laterally on the supports 39 and 40 and the side wall 32 is provided with a slot (not shown) of sufficient size to permit the tray to be slid into and out of the cabinet through such slot, and a handle 41' on the tray facilitates the moving of the tray. As shown in FIG. 4, the tray 41, when in place on its supports, preferably slopes slightly from the horizontal, for example with an inclination of approximately 15°. The reason for this will be apparent presently.

A semi-cylindrical container guide 43 is attached to the base 11 inside the cabinet in the relative position indicated in FIGS. 4 and 5. This serves as a holder for a spray container 44 having a supply of clear, quick-drying lacquer. The container is provided with a top spray nozzle 44' from which the lacquer is sprayed in the form of a fine mist whenever the nozzle is pressed downwardly. Such spray containers for discharging vaporized liquid sprays are common and well known and consequently no further description of this container with its spray nozzle is necessary.

For the purpose of exerting the necessary downward pressure on the spray nozzle for discharging the lacquer spray a substantially horizontal arm 45, having one end pivotally mounted in a support 46, extends across the top of the spray nozzle. The other end of this arm 45 is connected by a link 45' to a spring-controlled core member 48 of a solenoid 47. Activation of the solenoid 47 causes the core member 48 to be pulled downwardly against the force of its spring, thus causing the arm 45 to bear down on the top of the spray nozzle and cause spray to be discharged from the container as a result of such activation of the solenoid. Preferably the closing of the circuit to the solenoid 47 is controlled by a suitable timing switch 49 so that the discharging of the spray lacquer from the container will take place for a predetermined desired interval upon the operation of the control switch.

The sample 50 which is being tested is mounted on the tray 41, the tray is set in place in the cabinet, and the solenoid is actuated, with the result that the lacquer spray is momentarily discharged over the face of the sample. Part of the fine spray or mist which strikes the sample will build up around any raised fibers on the surface without appreciably disturbing such raised fibers, and, upon drying, causes the size of the raised fibers to be amplified so that they can easily be seen or felt. It has been found that the slight inclination, previously described, given to the tray 41, and thus to the surface of the sample being tested, facilitates the building up of the spray particles around the raised fibers, and the distance from the spray nozzle at which the sample is positioned is also chosen, with respect to the size of the spray area, so that a considerable portion of the spray mist will pass along the face of the sample.

The lacquer used for spraying upon the sample should be colorless and quick-drying, preferably capable of drying within one minute. There are several lacquers which meet these requirements and are available on the market. One such lacquer, for example, is supplied by Grumbacher Inc., New York city, under the name "Varnish Spray No. 543," and is used extensively for waterproofing drawings.

If the bonding of the fibers in the sample has been so satisfactory that practically no fibers have been raised by the abrasive treatment given the sample, then the only effect produced on the face of the sample by the lacquer spray will be to give the surface a more glossy appearance. Thus the result of this second step in the method is to disclose very clearly and almost immediately, upon the drying of the spray of lacquer, the extent to which there are raised fibers on the surface and consequently whether or not the binding of the fibers in the sample has been satisfactory. By using a quick-drying lacquer, as mentioned, the entire test, both the step of subjecting the surface of the sample to a brief abrasive treatment and the step of applying the lacquer spray, require a total of very little time. Obviously also no particular skill on the part of the operator is required for either of the two steps in the method.

Other means could of course be used for subjecting the sample to abrasive treatment, and similarly also other means could be used for directing and controlling the application of a spray of lacquer onto the surface being tested, but the two simple devices herein described form a composite apparatus which has been found to be very satisfactory over an extended trial period, and consequently such composite apparatus is considered the preferred means for carrying out the method of the invention.

I claim:
1. The improved method of ascertaining the condition of the fiber bond in the surface of a sample of a fibrous cellulosic sheet being manufactured, which method includes first abrading the surface of the sample sufficiently to cause partial raising from the surface of unsatisfactorily bonded fibers in the surface, and subsequently having a fine mist-like spray from a quick-drying coating composition move over said surface without appreciably disturbing any raised fibers thereon so as to cause particles of said composition to collect around the raised unsatisfactorily bonded fibers on said surface and enable such fibers on said surface to be readily detected when such spray particles have dried.

2. The improved method of ascertaining the condition of the fiber bond in the surface of a sample of a paper product being manufactured, which method consists in first subjecting the surface of the sample to abrasive brushing sufficient to cause unsatisfactorily bonded fibers in the surface to become partially raised from the surface, and subsequently spraying said surface with a fine mist from quick-drying clear lacquer for a brief predetermined period without appreciably disturbing any raised fibers on said surface so as to cause particles of the sprayed lacquer mist to collect around the raised unsatisfactorily bonded fibers on said surface, and allowing such collected mist particles to dry, thereby enabling such fibers to be more readily detected.

3. In an assembly of the character described for ascertaining the condition of the fiber bond in the surface of a sample of a paper product, an abrading device for producing a desired predetermined amount of abrasion on said surface of said sample to cause unsatisfactorily bonded fibers to be partially raised from said surface, said device including a driven roll having an engageable surfacing, a reversible motor driving said roll, an abrading brush having elements bearing against said roll with predetermined pressure, a first guideway for guiding said sample between said roll and said brush elements when said roll is being rotated in one direction by said motor, whereby said surface of said sample will be subjected to abrasion by said brush elements as said sample is drawn along by said roll between said roll and said brush, a second guideway beyond said roll in alignment with said first guideway, both guideways extending in the same plane, a motor switch member at the end of said second guideway for stopping the operation of said motor when engaged by said sample in said second guideway, and means for operating said motor and therewith said roll in the opposite direction, whereby to cause said sample to be drawn past said brush elements a second time and returned to said first guideway with the unsatisfactorily bonded fibers on said surface partly raised.

References Cited in the file of this patent
UNITED STATES PATENTS

| | | |
|---|---|---|
| 1,212,854 | Vuono | Jan. 16, 1917 |
| 1,417,587 | Tully | May 30, 1922 |
| 2,189,589 | Mahannah et al. | Feb. 6, 1940 |
| 2,705,171 | Ziherl | Mar. 29, 1955 |
| 2,787,153 | Ketchum et al. | Apr. 2, 1957 |
| 2,808,719 | Kommers | Oct. 8, 1957 |
| 2,971,382 | Harris | Feb. 14, 1961 |